United States Patent

[11] 3,538,905

[72] Inventors: Roy E. Reichenbach
38 Seca Place, Salinas, Calif. 93901, and
Joseph A. Talladira, 618 Walnut St., Apt. 6, Inglewood, California 90301
[21] Appl. No. 659,085
[22] Filed Aug. 8, 1967
[45] Patented Nov. 10, 1970

[54] HOME TYPE BARBECUING
3 Claims, 4 Drawing Figs.
[52] U.S. Cl. .................................................. 126/25, 250/88
[51] Int. Cl. ...................................................... A47j 37/00
[50] Field of Search ............................................. 250/88; 126/141, 25(C), 9(A); 350/310

[56] References Cited
UNITED STATES PATENTS

| | | | |
|---|---|---|---|
| 3,021,830 | 2/1962 | Witcher | 126/25(C)UX |
| 3,119,386 | 1/1964 | Farro | 126/25(C)UX |
| 3,320,942 | 5/1967 | Christensen | 126/25(C)UX |
| 1,384,294 | 7/1921 | Akeley | 350/310 |
| 2,943,557 | 7/1960 | Suehlsen | 126/9(A)UX |

Primary Examiner—Archie R. Borchelt
Assistant Examiner—C. E. Church
Attorney—Penrose L. Albright and William B. Mason ABSTRACT: A barbecue grill has a removable dome-shaped cover with a heat reflective inner lining for reflecting and concentrating heat in the firebowl. A hole at the apex of the cover aids combustion, and the lining may be disposable.

Patented Nov. 10, 1970 3,538,905

INVENTORS:
ROY E. REICHENBACH
JOSEPH A. TALLADIRA

HOME TYPE BARBECUING

This invention is concerned with a portable reflector device or apparatus which decreases the time required to obtain uniformly burning charcoal briquets suitable for use in conventional home barbecuing. Furthermore, the device may also be used during the cooking process as a reflector oven. This device is intended for use as an accessory to the common backyard home barbecue grill.

The common present methods of starting usable charcoal fires require considerable expenditure of time and effort. One of the most common methods involves placing various volatile fuels directly on the charcoal. This method in inefficient, since the volatile fuel-air flame is a diffusion controlled combustion process and the flame surface is relatively distant from the charcoal, hence the heat transfer to the charcoal is small. Also a large portion of the radiant energy emitted by the combustion zone is radiated to free space and hence does not enhance the ignition and combustion processes. The combustion of charcoal starts at the edges of the briquets and propagates very slowly over the entire surface area of the briquets.

In the case of an electric starter, the ignition process is primarily dependent on conduction of thermal energy from a resistively heated electric element at locations where the charcoal and the heating element are in intimate contact. Thus ignition of the charcoal begins only at isolated points of contact. Also, most of the radiant energy emitted by the hot element and the isolated points where combustion starts is emitted to free space, resulting in excessive losses. Since combustion begins at isolated areas on the briquet, a relatively long period of time is required for the combustion zone to propagate over the entire surface of the briquets. Another disadvantage is that charcoal must be rearranged once it is ignited. When the coals are rearranged, the time required before uniform combustion is established is increased.

Some existing home barbecuing units have covers or tops that may be used to obtain an oven or baking effect. These covers are normally of a material that absorbs thermal radiation instead of reflecting it. Hence these covers are a hindrance if used in the fire starting process and do not function well as ovens until the cover has absorbed a sufficient amount of energy to obtain a high temperature, such that they radiate as hot black bodies.

Existing reflector ovens were developed for use with open fires such as camp fires and are not readily adapted for use with home type barbecues. These reflector ovens are placed on one side of the fire and do not utilize any of the energy radiating in other directions, hence they are inefficient for use with home barbecues. Present oven type home barbecues do not employ radiation reflectors in the cooking process with a consequent extension of cooking time.

The first object of the invention is to provide a device which is very efficient in reflecting the radiant energy emitted by the combustion zone and the coals back onto the charcoal where it will be reabsorbed. Thus the radiant energy is not lost to free space and the time required to obtain coals usable for cooking is decreased by approximately 60 percent (as determined by experiment). The second object of the invention is to provide a simple and portable accessory that may be used as a reflector oven unit for the conventional home barbecue grill.

To accomplish the first object, the charcoal or briquets are placed in the fire bowl of a conventional home barbecue unit. No special arrangement of the briquets is required. Then starter fuel is placed directly on the charcoal and the grill is put in place. Next the started fuel is ignited and then the reflector device is placed on the grill. No further rearrangement of the briquets or additional fuel is required. The reflector device is removed when uniformly burning coals are obtained. Alternatively, for use with an electric starting element, the charcoal and the electric element are placed in the firebowl, and the reflector is placed on the grill. When uniformly burning coals are obtained the reflector and the electric element are removed.

The reflector device is made of a highly reflective material (chrome, stainless steel, or polished aluminum) and has the shape of a paraboloid of revolution or a frustrum of a cone such that any radiation reflected from its underside would be focused and concentrated on the charcoal beneath it. As mentioned above, the combustion reactions emit radiant energy directly and also the briquets radiate as gray or black bodies as their temperatures increase. This radiated energy is normally lost. The reflector device described above functions by reflecting and focusing the radiant energy that would normally be lost back onto the briquets. Since the briquets have a high absorptivity, the reflected radiant energy incident upon them is absorbed. The absorption of this energy tends to maintain or increase the temperature of the briquets and also heats any surface area of the briquets that has not started to burn at any given time. Increasing the surface temperature of the briquets increases the decomposition rates and accelerates heterogeneous chemical combustion rates. These processes decrease the time required to obtain uniformly burning coals suitable for barbecuing.

The device has a ventilation port, or hole, incorporated at its upper extremity when in place on the grill. This ventilation port is essential to assure that adequate fresh air (oxygen) is convected to the charcoal combustion zone to oxidize the carbon in the charcoal to gaseous carbon monoxide and gaseous carbon dioxide and prevents soot formation due to incomplete combustion. Additionally, the ventilation port assures rapid natural convection of the products of combustion from the combustion zone and the volume under the device. This natural convection minimizes carbon soot condensation and deposition on the reflecting surface. Soot deposition on the reflecting surface from either incomplete combustion or condensation would lower the reflectivity of the surface, thus defeating the purpose of the reflective surface.

To accomplish the second object, the reflector is used as a reflector oven; the food is placed on the grill over the burning coals and covered with the reflector. In this position radiation normally passing by the food and escaping to free space is reflected back to the food, hence reducing the cooking time required and eliminating the necessity of turning the food over while cooking.

The above objects and the invention will be better understood with reference to its construction and use by reference to the accompanying drawings.

Figure 4:
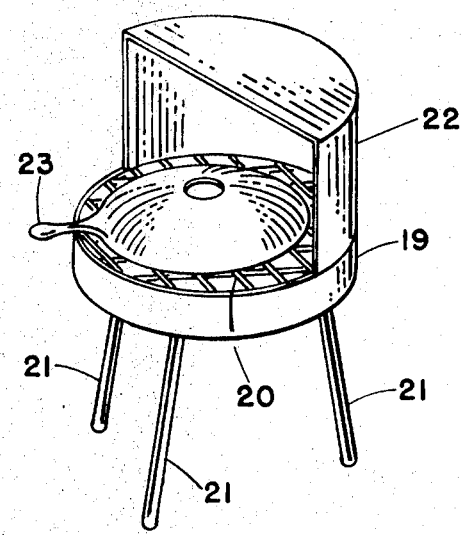

FIG. 4 shows a standard home type barbecue with firebowl 19, grill 20, legs 21, cover 22 and with reflector 23 in using position.

Figure 1:
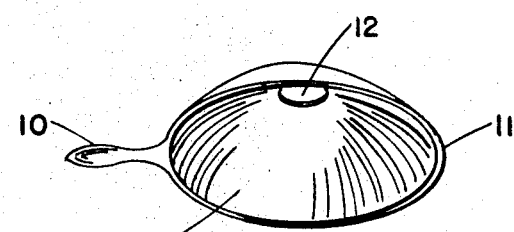
FIG. 1 shows a reflector made of one piece construction.

The reflector in FIG. 1 consists of a handle 10, reflector body 11 with a ventilation port 12, molded, cast, or stamped in one piece with a highly reflective, easily cleaned inner surface 13. The handle 10 preferably may be a separately mounted or installed part made of an insulation material in order that it would not get excessively hot to the touch.

Figure 2:
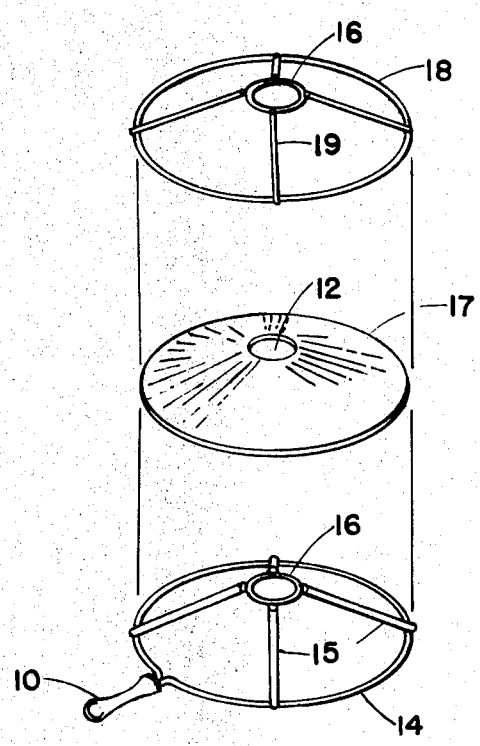
FIG. 2 shows an exploded view of a multiple piece reflector assembly.
Figure 3:
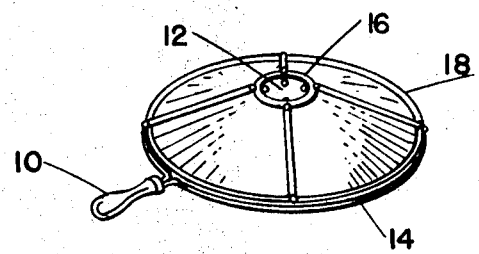
FIG. 3 shows the multiple piece reflector assembly.

The multicomponent reflector assembly shown in FIG. 2 consists of handle 10, reflector foil support frame 14, a plurality of ribs 15, and port ring 16, reflective material 17, and reflector cover 18 with a plurality of ribs 19 and port ring 16. The diameter of the rings 14 and 18 are similar as are the lengths of the ribs 15 and 19. Ribs 15 and 19 may be made either straight as shown or curved. The reflective material 17 is made of disposable metal foil similar to the common household aluminum foil with a ventilation port 12, and is pressed over the support frame 14 which gives it the desired shape for the proper reflection angles. The reflective material is easily replaced with household aluminum foil.

The reflector cover 18 is then placed over the reflective material 17 to help it retain its desired shape and to prevent its possible movement on windy days or from other outside action which may cause it to move. The reflector cover 18 may be attached to and hinged from support frame 14 to give a unitized construction. The handle 10 may be a separate component as shown or formed as an integral part of the support frame 14. The handle 10 may also be made with a small overhang or hook so that the reflector assembly may be hung on the side of the barbecue when not in use. The diameter size of the reflector body 11 or support frames 14 and reflector cover 18 are preferably made smaller than the standard barbecue grill size as shown in FIG. 4 in order to promote the necessary air circulation through the ventilation port 12.

The discussion above is considered illustrative only of the principles of the invention. Since numerous other modifications may occur to those skilled in the art, it is not desired to limit the invention to the exact construction, material, and operation shown and described. It is intended that the following claims cover all such modifications and equivalents that may be resorted to.

We claim:

1. A portable combustion aid device for use on the open grillwork of a barbecue having a firebowl comprising a cover means with a periphery and a handle attached to said cover means adjacent said periphery, said cover means being dome-shaped with its inner concave heat reflective and surface having the general shape of a paraboloid so as to reflect radiation during startup when the periphery of said cover means is placed on the grillwork above ignited fuel in a firebowl, said cover means having an escape port at its apex to insure the passage of combustion gases and the like by natural convection and to increase the circulation of air beneath said cover means.

2. The device of claim 1, wherein said cover means comprises a frame assembly having port ring means at its apex and supporting means between the periphery of said cover means and said apex, said supporting means being curved to present a concave configuration for receiving and forming a paraboloid reflective surface.

3. The device of claim 2, wherein said frame assembly includes two dome-shaped framed components and each of said components has a port ring at its apex and a circular periphery with curved ribs connecting said apex to said periphery whereby disposable reflective foil can be sandwiched between said components to form a paraboloid reflective surface.